(12) United States Patent
Karoubi

(10) Patent No.: US 7,571,322 B2
(45) Date of Patent: Aug. 4, 2009

(54) ENHANCED COOKIE MANAGEMENT

(75) Inventor: Stephane Karoubi, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 843 days.

(21) Appl. No.: 10/915,530

(22) Filed: Aug. 10, 2004

(65) Prior Publication Data

US 2006/0036875 A1 Feb. 16, 2006

(51) Int. Cl.
*H04L 9/00* (2006.01)
(52) U.S. Cl. .................................... 713/172
(58) Field of Classification Search ................. 713/172, 713/185, 180, 153; 726/10; 709/225, 229
See application file for complete search history.

(56) References Cited

U.S. PATENT DOCUMENTS

| | | | | |
|---|---|---|---|---|
| 6,047,268 | A | * | 4/2000 | Bartoli et al. .................. 705/35 |
| 6,374,359 | B1 | * | 4/2002 | Shrader et al. .................. 726/5 |
| 6,601,170 | B1 | * | 7/2003 | Wallace, Jr. .................. 713/168 |
| 7,072,984 | B1 | * | 7/2006 | Polonsky et al. ............ 709/246 |
| 7,137,006 | B1 | * | 11/2006 | Grandcolas et al. ......... 713/180 |
| 7,216,236 | B2 | * | 5/2007 | Kou et al. ................... 713/183 |
| 2004/0103200 | A1 | | 5/2004 | Ross et al. |
| 2005/0021791 | A1 | * | 1/2005 | Sakiyama et al. ........... 709/229 |

OTHER PUBLICATIONS

Kristol, "HTTP Cookies: Standards, Privacy, and Politics," ACM Transactions on Internet Technology, vol. 1, No. 2, Nov. 2001, pp. 151-198.
Chartier, "15 Seconds: Serialization in the .NET Framework," www.15seconds.com, Sep. 3, 2002.
Hashtable Class, .NET Framework Class Library, Microsoft Corporation.
Pope, "Basics of Cookies in ASP.NET," Microsoft Corporation, Jan. 2003.
Sit, et al., "Inside risks: Web cookies: not just a privacy risk," Communications of the ACM, vol. 44, No. 9, 2001, p. 120.
"Passport Crypt Object," Microsoft .net Passport SDK, Microsoft Corporation, 2004.
Session State, .NET Framework Developer's Guide, Microsoft Corporation, 2004.
Visual Basic and Visual C# Concepts, Introduction to ASP.NET Web Applications in Visual Studio, Microsoft Corporation 2004.
Plourde, "15 Seconds: Encrypting Cookie Data with ASP.NET," Dec. 10, 2002.
Mitigating Cross-site Scripting with HTTP-only Cookies, Microsoft Corporation, 2004.
HttpCookies Class, .NET Framework Class Library, Microsoft Corporation, 2004.
Berghel, Communications of the ACM, Portal ACM Digital Library, vol. 44, No. 5 (2001), pp. 19-22.

* cited by examiner

*Primary Examiner*—Ellen Tran
(74) *Attorney, Agent, or Firm*—Vierra Magen Marcus & DeNiro LLP

(57) ABSTRACT

A method of processing cookies for use in a computer includes using at least two of a number of available processing steps. The steps may include encrypting a cookie prior to entering the cookie in a cookie container; compressing a cookie prior to entering the cookie in a cookie container; serializing a cookie prior to entering the cookie in a cookie container; entering the cookie data in a data dictionary; setting an HTTP-only attribute prior to allowing the cookie to be transmitted to a server; and/or setting a secure transmission only attribute prior to allowing the cookie to be transmitted to a server.

13 Claims, 5 Drawing Sheets

Response

Request

ENHANCED COOKIE MANAGEMENT

BACKGROUND OF THE INVENTION

1. Field of the Invention

The invention relates generally to computer systems and the Internet, and more particularly to Internet security.

2. Description of the Related Art

Many web sites attempt to store information on a user's computer in a small file referred to as a cookie. Cookies provide for HTTP state management, by which a server may correlate multiple requests coming from the same client. Cookies may include sensitive and personal information, or the keys needed to get to a user's sensitive and personal information.

Because of their ability to store and exchange sensitive and personal information, cookie security has become a significant concern to individual users, software manufacturers and providers of Internet content. There are generally two types of cookies: session cookies and permanent cookies. Session cookies are temporary and exist only as long as the browser session is open. Session cookies do not get stored on a computer's hard disk, but are kept in memory. Permanent cookies are generally stored on a hard disk until a specified expiration time. The location of cookies differs with each browser, but cookie management is generally handled by a browser and the server.

One example of a relatively recent but common security problem is cross-site scripting. Cross-site scripting is a server-side vulnerability that enables malicious script (e.g., written by a hacker) to execute on a client machine in the domain of that vulnerable server. This may cause cookie information to be provided to an invalid domain, or to provide sensitive information as a result of a script extracting information to malicious websites. In general, cross-site scripting tricks a user into sending a malicious script to the server, and the server then returns the script as part of the server's returned content. When the content is interpreted, the script is executed in the security context of the server's domain.

Another example of a security concern with respect to cookie data are "replay attacks." With this type of attack, the attacker captures the user's authentication cookie using monitoring software and replays it to the application to gain access under a false identity.

Hence, methods and systems which address security, predictability and performance concerns in the use of cookies in web applications are of great value.

SUMMARY OF THE INVENTION

The present invention, roughly described, pertains to a method of processing cookies for use in a computer. The method includes using at least two of a number of available processing steps. The steps may include encrypting a cookie prior to entering the cookie in a cookie container; compressing a cookie prior to entering the cookie in a cookie container; serializing a cookie prior to entering the cookie in a cookie container; entering the cookie data in a data dictionary; setting an HTTP-only attribute prior to allowing the cookie to be transmitted to a server; and/or setting a secure transmission only attribute prior to allowing the cookie to be transmitted to a server.

The method may include an additional feature of providing a timespan attribute for a session cookie. Still further, the method may include validating the cookie using a timespan attribute.

The invention may also comprise a system for use in a computing environment. The system may include a browser component that parses and interprets requests and responses. The system may also include a security mechanism operatively coupled to the transport medium, including controlling access to a cookie container using at least two of: a cryptographic method; a compression/de-compression method; a serialization/de-serialization method; and a dictionary entry method.

In another aspect, the invention is a computer readable medium having a data structure stored data structure, comprising: a cookie container; and a serialized cookie including at least one attribute encrypted using an encryption key.

In still another aspect, the invention is a method for setting a cookie in a first computer. The method may comprise the steps of converting the cookie to a stream, compressing the cookie, encrypting the cookie using an encryption key, and setting the cookie in a cookie container.

The invention may further comprise a method for requesting a web page from a server. The method may include the steps of: extracting a cookie from a cookie container; creating a data dictionary entry for the cookie; setting an HTTP-only attribute for the cookie; setting a secure transmission only attribute for the cookie; and issuing a page request including said data dictionary entry.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

DETAILED DESCRIPTION

Figure 1:
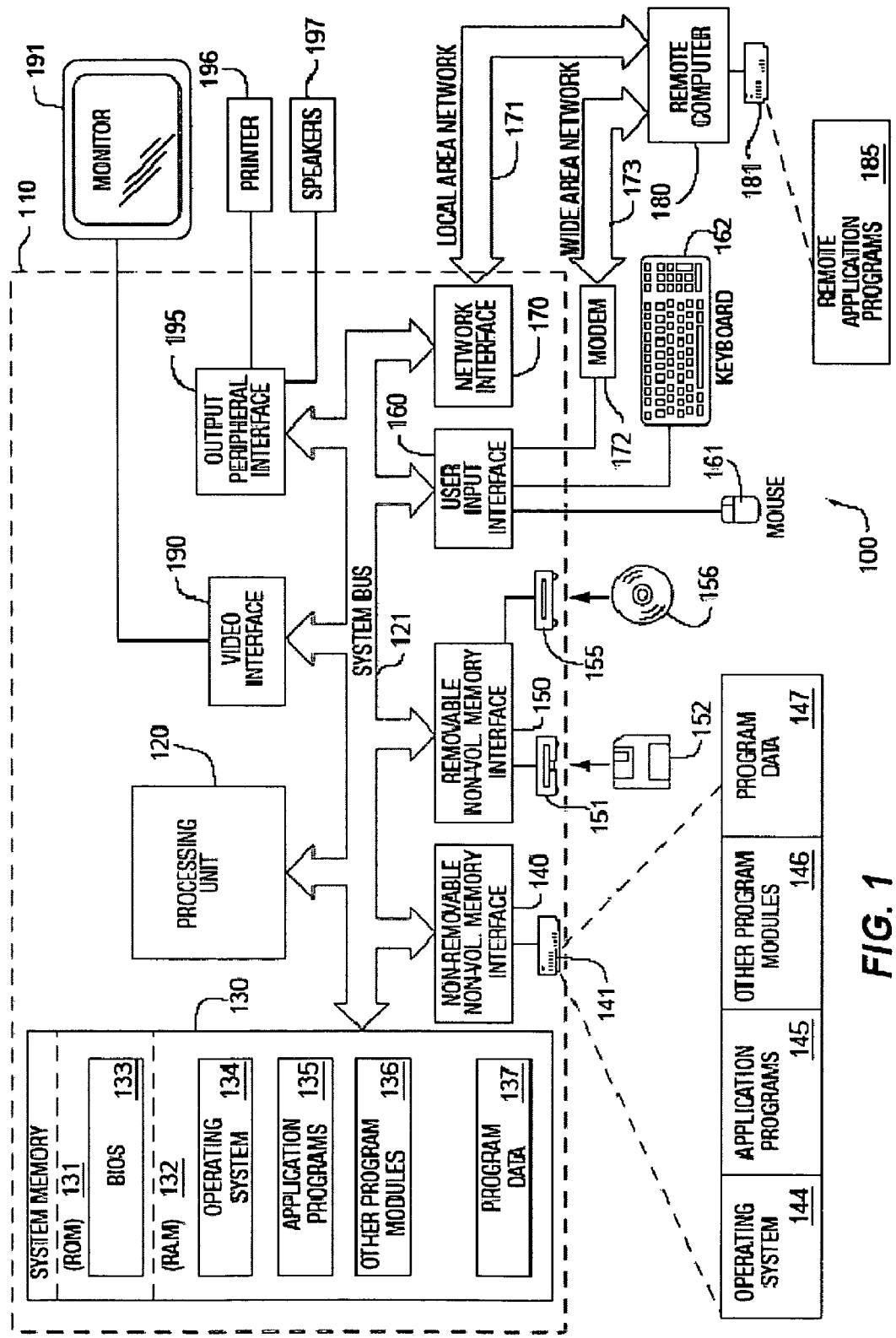
FIG. 1 is a block diagram generally representing a computer system into which the present invention may be incorporated.
Figure 2:
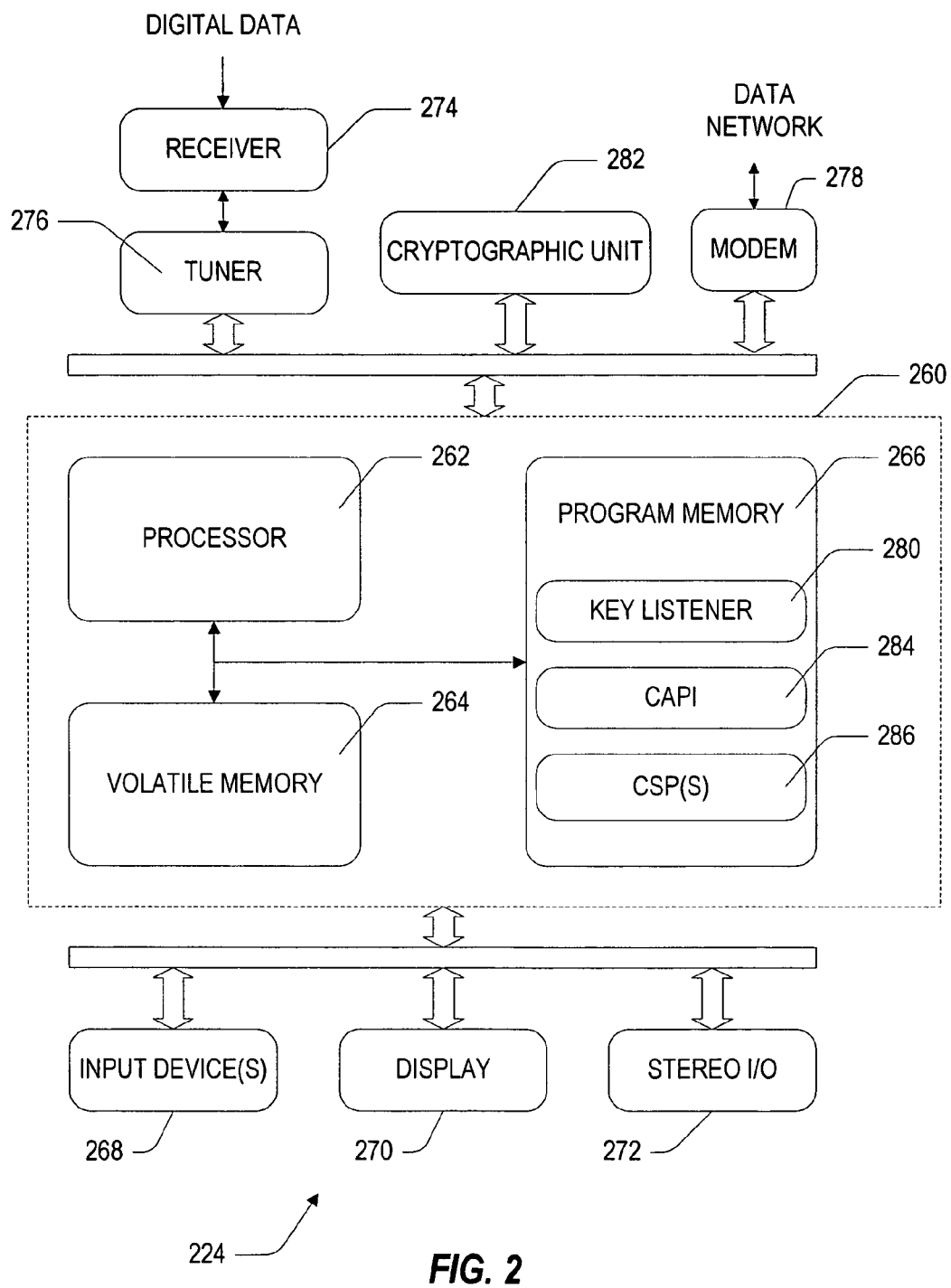
FIG. 2 is a block diagram of a second type of computer system into which the present invention may be incorporated.

FIGS. 1 and 2 illustrate two examples of suitable computing systems in which to practice the present invention. FIG. 1 represents a generalized computing system, while FIG. 2 represents a broadcast computing system, such as a set-top box.

FIG. 1 illustrates an example of a suitable general computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Certain features of the invention are particularly suitable for use with a broadcast enabled computer which may include, for example, a set top box. FIG. 2 shows an exemplary configuration of an authorized client 224 implemented as a broadcast-enabled computer. It includes a central processing unit 260 having a processor 262, volatile memory 264 (e.g., RAM), and program memory 266 (e.g., ROM, Flash, disk drive, floppy disk drive, CD-ROM, etc.). The client 224 has one or more input devices 268 (e.g., keyboard, mouse, etc.), a computer display 720 (e.g., VGA, SVGA), and a stereo I/O 272 for interfacing with a stereo system.

The client 224 includes a digital broadcast receiver 274 (e.g., satellite dish receiver, RF receiver, microwave receiver, multicast listener, etc.) and a tuner 276 which tunes to appropriate frequencies or addresses of the broadcast network. The tuner 276 is configured to receive digital broadcast data in a particularized format, such as MPEG-encoded digital video and audio data, as well as digital data in many different forms, including software programs and programming information in the form of data files. The client 224 also has a modem 278 which provides dial-up access to the data network 228 to provide a back channel or direct link to the content servers 222. In other implementations of a back channel, the modem 278 might be replaced by a network card, or an RF receiver, or other type of port/receiver which provides access to the back channel.

The client 224 runs an operating system which supports multiple applications. The operating system is preferably a multitasking operating system which allows simultaneous execution of multiple applications. The operating system employs a graphical user interface windowing environment which presents the applications or documents in specially delineated areas of the display screen called "windows." One preferred operating system is a Windows® brand operating system sold by Microsoft Corporation, such as Windows® 95, Windows® NT, Windows®XP or other derivative versions of Windows®. It is noted, however, that other operating systems which provide windowing environments may be employed, such as the Macintosh operating system from Apple Computer, Inc. and the OS/2 operating system from IBM.

The client 224 is illustrated with a key listener 280 to receive the authorization and session keys transmitted from the server. The keys received by listener 280 are used by the cryptographic security services implemented at the client to enable decryption of the session keys and data. Cryptographic services are implemented through a combination of hardware and software. A secure, tamper-resistant hardware unit 282 is provided external to the CPU 260 and two software layers 284, 286 executing on the processor 262 are used to facilitate access to the resources on the cryptographic hardware 282.

The software layers include a cryptographic application program interface (CAPI) 284 which provides functionality to any application seeking cryptographic services (e.g., encryption, decryption, signing, or verification). One or more cryptographic service providers (CSPs) 286 implement the functionality presented by the CAPI to the application. The CAPI layer 284 selects the appropriate CSP for performing the requested cryptographic function. The CSPs 286 perform various cryptographic functions such as encryption key management, encryption/decryption services, hashing routines, digital signing, and authentication tasks in conjunction with the cryptographic unit 282. A different CSP might be configured to handle specific functions, such as encryption, decryption, signing, etc., although a single CSP can be implemented to handle them all. The CSPs 286 can be implemented as dynamic linked libraries (DLLs) that are loaded on demand by the CAPI, and which can then be called by an application through the CAPI 284.

In accordance with the present invention, a series of techniques are utilized alone or in various combinations to increase the security, predictability, and performance of cookie handling in internet applications.

In one aspect, cookies are encrypted prior to being provided to a cookie store. Encryption may occur with both session cookies and persistent cookies stored on a local hard drive. Cookies may likewise be decrypted for use in web-based applications.

In another aspect, cookies are compressed prior to provision in a cookie store or storage, and decompressed prior to use. Compression may occur for both session cookies and persistent cookies. In yet another aspect, cookies are, by default, designated as "HTTP-only" before being provided to a designated domain. In still another aspect, cookies are, by default, designated for secure transmission.

Still further, session cookies are provided with an internal "time span" parameter which is checked when the cookies are decrypted and/or compressed. This feature provides a further level of security to determine whether the cookie remains valid. Session cookies are normally not provided with an expiration date; when cookies are provided with an expiration time, they are persistent.

In still another aspect, cookie information is serialized into a dictionary, and applications requiring cookie data access the dictionary rather than the cookie information directly. In yet another aspect, specific web applications which provide access to sensitive user information are further scanned by requiring a separate secure hash portion of a session cookie established between a server and a client machine. Each of the aforementioned features is implemented by instructions on a client machine, a server machine or both.

Figure 3:
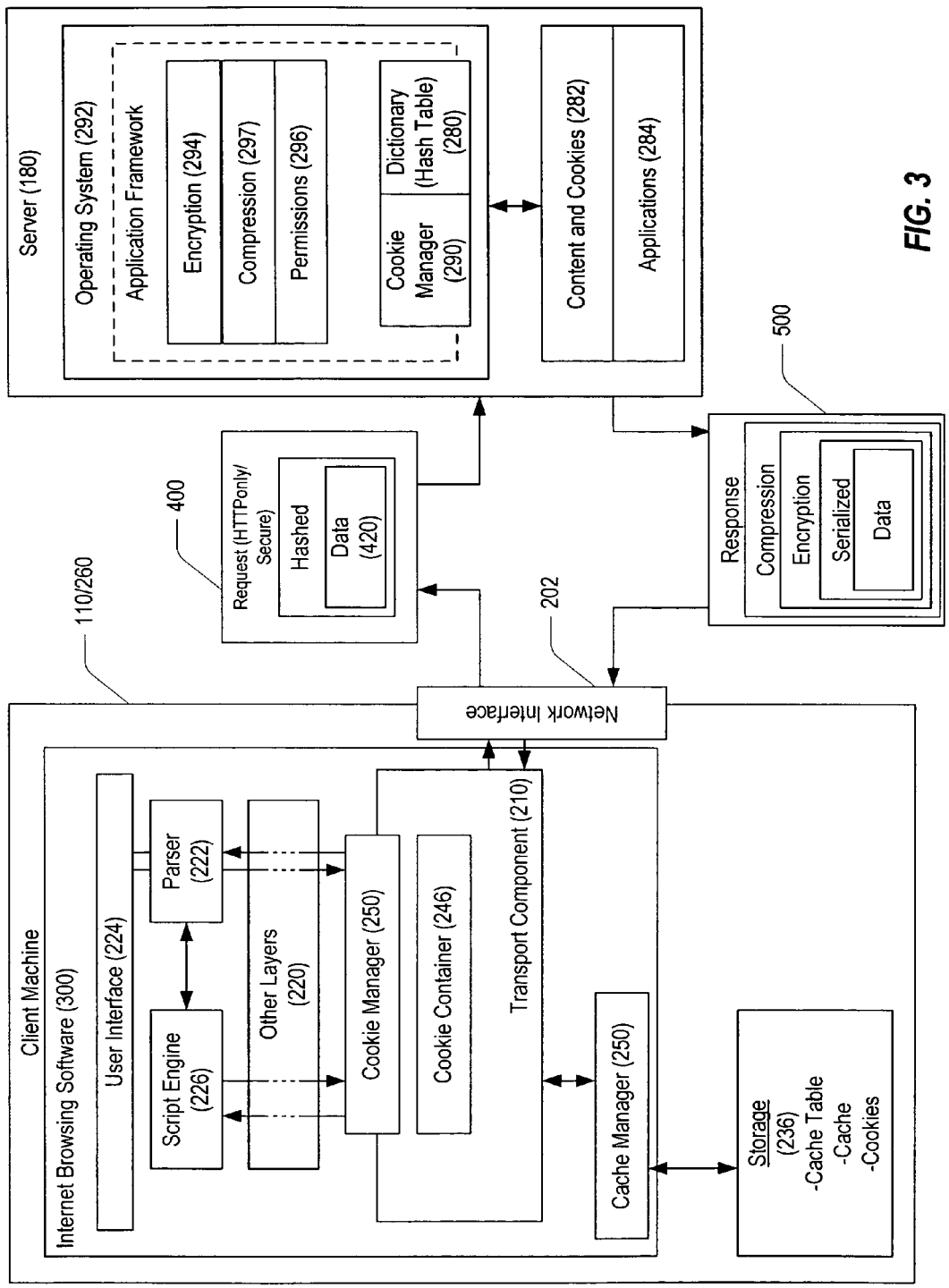
FIG. 3 is a block diagram generally representing data exchanged among components in a client machine, with components of a server machine, in accordance with the present invention.

FIG. 3 shows a generalized conceptual model of one implementation of the present invention, in which browsing software 300 executing in a client machine (e.g., the computer system 110 of FIG. 1 or the broadcast computer 224 of FIG. 2) communicates via network interface software and hardware 202 with a remote server 180 (e.g., one of the remote computer(s) 180 of FIG. 1). The communication may include requests for content or the like (e.g., HTTP "GET" requests) such as the request 204, and result in responses such as the response 206 being received from the server 180. Communication between the client 110 and the server 180 typically uses a well-known network protocol, such as hypertext transfer protocol (HTTP). As used herein, "server" or "network server" includes any machine or combination of machines having content and (in keeping with an aspect of the present invention as described below) cookies maintained thereon or in association therewith, shown in FIG. 2 as the block labeled 282. Network servers may thus include HTTP "web sites," including those having sites with different names (which may be regarded as different virtual servers even if they are hosted on the same physical machine) as well as web applications 284 which use the cookies provided by server 282 and managed by client 110 (both persistent and session cookies). Note that a web site may be distributed over many virtual servers, which in turn may be distributed over many physical machines.

As further represented in FIG. 3, an internet transport component 210 handles some of the processing of the response 500. Part of the response 500 comprises one or more headers, and data which has been serialized. As represented in FIG. 3, the server response 500 may include requested content and/or cookie (data) to a memory stream, encrypted and/or compressed.

When content data is returned, the data is passed from the internet transport component 210 (and though other layers of code 220) to browser parser/interpreter code 222 via the cookie manager 250. The parser 222 then parses and interprets the content for displaying to the user via a browser user interface 224. The browser parser/interpreter code 222 may invoke a script engine 226 as needed to interpret any script embedded in or referenced by the content. Similar content also may be stored in a local cache in storage 236, which is accessed via a cache manager 232 that is included in or otherwise associated with the internet transport component 210. For example, the cache manager component 232 manages the cache by maintaining site-to-local-file mappings in a cache table or the like, such that the content and related data may be locally accessed as appropriate. Note that although FIG. 3 shows a single storage unit 236 (e.g., the hard disk drive 141 of FIG. 1) as maintaining the various data, as is understood the data may be maintained in and/or distributed among separate storage units.

The internet transport component 240 includes or is otherwise associated with a mechanism that stores and retrieves cookies, referred to as cookie container 246. Although the cookies 248 are maintained in the system storage 236, for simplicity, the mechanism 246 (which executes in RAM) and stored cookie data 248 (which may reside in RAM, nonvolatile storage or a combination of both) may be together considered as a cookie store container (FIG. 3).

In accordance with one aspect of the present invention, the internet transport component 210 includes or is otherwise associated with an client cookie manager 252 implementing various aspects of the cookie management system of the present invention. The manager may invoke instructions to perform the techniques described herein to provide security to the cookies set on machine 110.

Server 180 may include a suitable operating environment 292 in which the invention may be implemented. The operating environment 292 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The environment may include an application framework 300, which is a platform including design- and run-time objects and controls which allows for running applications on a web server. The framework 300 is not required, and the services described below as being a component of the framework may likewise be incorporated into the operating system or provided as independent applications running in the operating system. The application framework 300 may include resource classes implementing functions such as encryption 294, compression 297 and authentication 296 in accordance with the present invention. Also provided on the server 180 is a data dictionary 280 and a server cookie manager 290. The data dictionary may comprise a collection of key-value pairs. Elements can be added to the hash table by calling add methods which pass in the key-value pairs that one wants to add.

The server cookie manager 290 implements aspects of the techniques described below on the server 180. A client cookie manager 250 implements one or more number of techniques to secure cookie data on the client. Generally, cookies are provided to a server 180 on a read or "request" operation, and are written to the client machine during a write or "response" operation. Cookies are maintained in the client in an encrypted, compressed and serialized form. In one embodiment, the encryption, compression and serialization functions are provided by calls to components of the operating system or the application framework.

Figure 4:
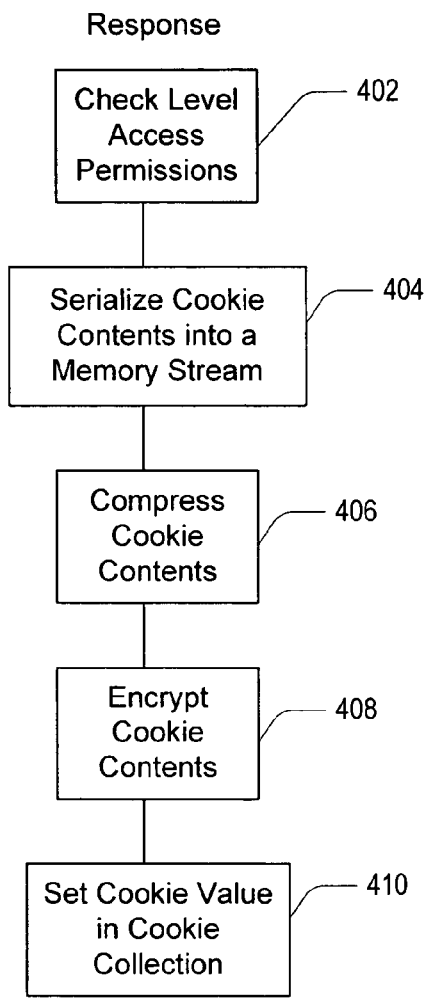
FIG. 4 is a flow chart representing the process for implementing a cookie response in accordance with the present invention.

One or more of the steps shown in FIG. 4 may be used when cookie data is to be stored in the cookie container, such as during a "response". In one embodiment, the steps of FIG. 4 are preformed by the cookie manager 290 prior to transmitting the cookie to the client. Alternatively, the steps may be performed after passing the cookie to the client cookie manager 250. First, at step 402, access permission to the cookie is checked. As described below with respect to FIG. 7, this may involve determining whether a secure service cookie hash accompanies the set cookie command. Next, at step 404 contents of the cookie are serialized into a memory stream. This prevents users from easily viewing the contents of the cookie. At step 406, the cookie is compressed and at step 508 the cookie is encrypted. Finally at step 510, the cookie is set in the cookie collection. If preformed at the server 180, information transmitted from a server 180 to client 110 is thus in a secure form.

Figure 5:
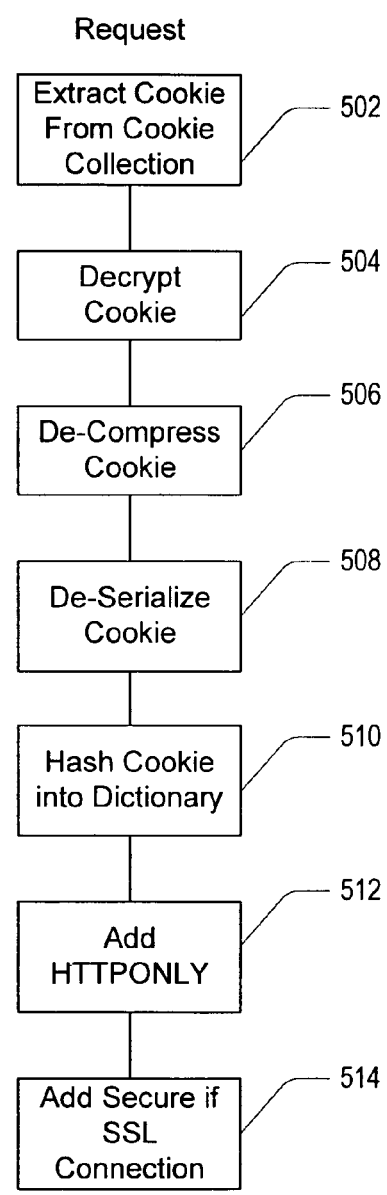
FIG. 5 is a flow chart representing the process for implementing a cookie request in accordance with the present invention.

When cookie information is required, such as during a request process, the process shown in FIG. 5 is used. Cookies are first extracted from the cookie collection, at step 502. Next, the cookie is decrypted at step 504, decompressed at step 506, de-serialized at step 508, entered into a data dictionary at step 510 and, in accordance with the present invention, the HTTP-only attribute (step 512) and secure transmission attribute (step 514) of the cookie are set. The HTTP-only setting is a setting included in the response header, which requires that the cookie only be provided in response to an HTTP request. This prevents operations such as cross-site scripting tasks and may be implemented by the cookie manager 250 in accordance with the teachings of U.S. Patent Application Publication No. 2004/0103200. The secure attribute advises the web browser to use secure channels when returning the cookie to the originating server. By setting this attribute as a default, this ensures that the server-side application cannot access the cookie unless the connection between the server and the client machine is a secure connection, such as SSL. Hence, a request 400, which is provided to server 180, includes data 420, which a hash table entry, provided only if the HTTP-only and secure flags are set.

In accordance with one embodiment of the invention, cookies maintained in the cookie collection are serialized into a memory stream prior to encryption and compression. It should be noted that serialization is one of the plurality of techniques used herein and may optionally be omitted. The first step in any serialization process is to take the instance of an object and convert it to a memory stream. From there, one has the ability to perform a number of file input/output operations. Serialization may be performed by code specifically adapted to perform serialization, or by a call to a serialization method provided by the application framework. One example of this are the core serialization methods available in the Microsoft®.Net framework.

In accordance with another aspect of the invention, upon deserializing the cookie after decryption and decompression, rather than deserializing the cookie into the standard text format, cookies are entered into a data dictionary. The dictionary may comprise hash-table object which contains items in key/value pairs. The keys are used as indexes and very quick searches can be made for values by searching through the keys. Applications 284 deal directly with the hash table rather than the cookie information. The use of the hash table provides a very efficient method of dealing with a large number of cookies. In one aspect, the hash table can be constructed and utilized in an operating system in accordance with well known techniques. In an alternative aspect, the hash table may be provided as a supporting class as part of the application framework. One example is the Microsoft®.NET framework hash table object. Hence, as illustrated in FIG. 3, when request 400 is provided to server 180 from client machine 110, the request includes hashed data 420. Server 180 includes a data dictionary 280, which allows applications 284, running on server 180 and requiring the content of cookies stored on the client machine 110, to perform lookups and determine the values of the cookie information provided in the response 400. Normally, when one writes a cookie using a particular page's response property, which exposes the object, and allows one to add the information being rendered to the browser by the page. However, in the present case, when an application writes information to a cookie, it is really dealing with the hashtable entry. Changes are then converted back to the serialized version on provision to the container.

The encryption used at step 504 may be provided by a component of the application framework as well. In one aspect, the encryption technique uses the Microsoft® password crypt object, which is part of the Microsoft®.NET Passport framework. This allows the client and server to use the same key to decrypt information transmitted from the server to the client in the response method, discussed below. The password crypt object encrypts blobs of data using the same participant key that is used to exchange .NET passport information sent to the passport network. Data can be decrypted using the same key as well. The compression utilized at step 506, may likewise be derived from the operating system of the underlying application framework.

Figure 7:
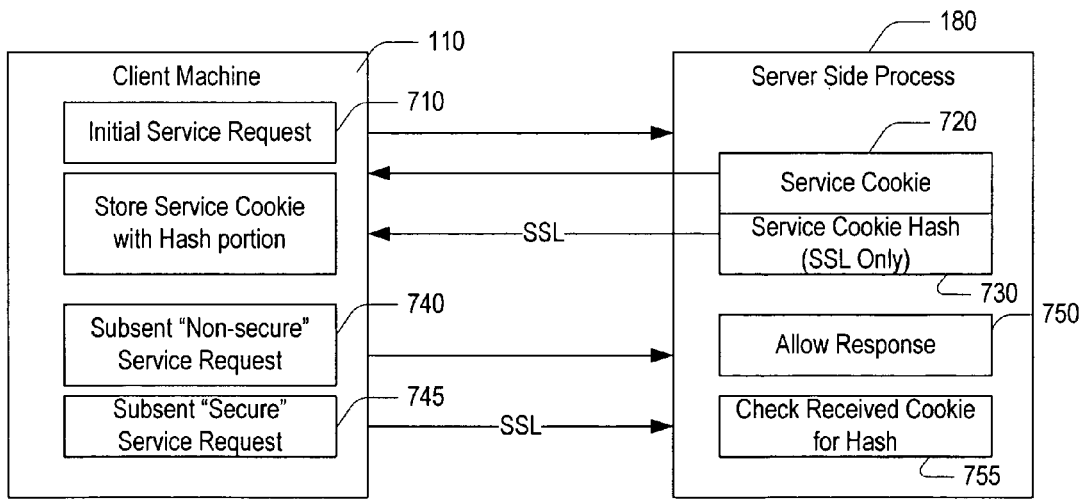
FIG. 7 is a block diagram generally representing data exchanged between a server and a client.

As discussed above, the first step in providing a response is a check of cookie access permissions at step 502. Access permissions are controlled by the application framework, and a brief example of one use of access permissions is shown in FIG. 7. In one aspect, this step determines whether a particular application running on server 180 is allowed access to the cookie.

FIG. 7 graphically illustrates a process wherein, upon creation of a service cookie, the application framework 295 also provides a separate security hash cookie, which is utilized to verify whether a given application should have access to a cookie. In FIG. 7, a client machine may wish to establish a service with a server 180. This aspect of the invention is particularly useful in broadcast television systems, such as those described with respect to FIG. 2, and in such case, server 180 can comprise a connection server. The client machine will provide an initial service request 710 to the server 180. Server 180 will establish service and set a service cookie 720, which can be provided via a non-secure connection 725 to client machine 110. Server 180 will also provide a hash of the service cookie 730, which will be provided to the client machine 112 via a secure connection 735. The server 180 will then distinguish between applications which require the secure service cookie hash and those that do not. For example, one may determine that e-mail applications can be allowed to retrieve cookies without the security has, and when a cookie request from server 180 is made from such a "non-secure" application, the non secure cookie 740 will be provided and a response from the server at 745 will be allowed. One may likewise determine that a client accounting application which contains client billing information must require the hash portion. Before a response to such a "secure" application will be made, the cookie manager will verify that the application is allowed access by determining whether the service cookie hash 735 is also present as part of the request. If such request is not included in the service cookie hash, the request can be denied. As noted above, cookies can be both permanent and session cookies. It will be understood that the principles and techniques of the present invention will be likewise applied to session cookies. Session cookies exist during the opening state of the browser. As such, cookies contained in the cookie container 246 may be session cookies and may likewise be compressed, encrypted and serialized when stored in cookie container 246.

In a further aspect of the invention, when session cookies are set, the session cookie may include a time span attribute. When a cookie is accessed, the time span attribute is checked to determine whether the cookie is still valid. Session cookies accessed beyond the time span attribute value may thus "expire" within the session. Generally, when one writes a cookie, several values are provided. Cookies are normally written to the user's disk where they can potentially stay unless one specifies a date and time on which the cookie expires. If one does not set a cookie's expiration, the cookie is created, but is not stored on a hard disk. Instead, the cookie is maintained as part of the user's session information. When the user closes the browser or if the session times out, the cookie is discarded. Non-persistent cookies or session cookies are useful for information that needs to be stored for a short time or that, for security reasons, should not be written to a disk or on the client computer. In the example of using set-top boxes, session information is generally stored in a non-persistent cookie. When the user navigates to a given web server, the server establishes a unique session for that user that lasts for the duration of the user's visit. The use of the time span attribute in the session cookie, coupled with the validation check of the attribute during each use of the cookie, allow session cookies to expire during the session.

Normally, proving an expiration value attribute on a cookie will automatically turn that cookie into a permanent persistent cookie. However, a time-span attribute is not an expiration time. Rather, the time span is an attribute checked during a decryption process for verification purposes. This aspect of providing a time-stamped session cookie, checked consistently on each decryption or access of the cookie, provides yet another level of security to determine whether the cookie is valid.

Figure 6:
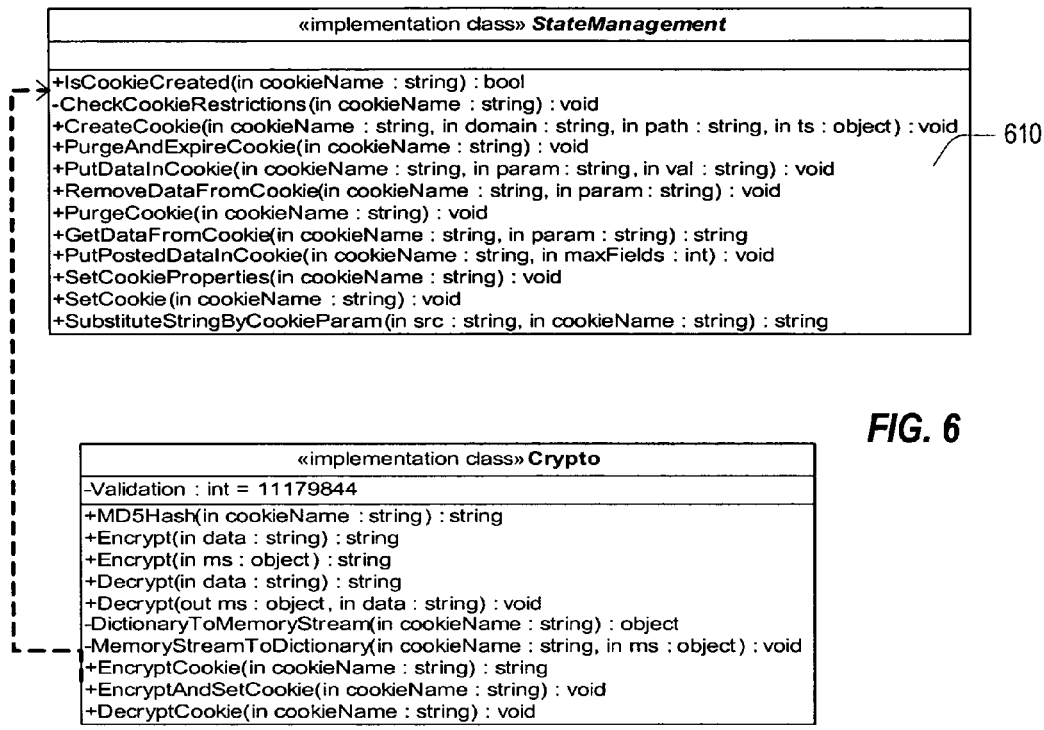
FIG. 6 is a state diagram illustrating the implementation classes utilized in the processes of FIGS. 4 and 5.

FIG. 6 shows state management and cryptography implementation classes which may be utilized to implement the processes of FIGS. 4 and 5. State management class 610 shows a series of functions, which implement the steps of FIGS. 4 and 5. Initially, IsCookieCreated method checks to determine whether a cookie exists or whether it needs to be created. CheckCookieRestrictions attribute determines whether the cookie is to be provided to a secure application (such as an accounting application (in the previous example)) or may be provided to a non-secure application (such as email). The CreateCookie method has parameters of the name, type, path, and time span indicated. As noted above, the time span parameter allows the cookie to be created as a session cookie having a given span and is the parameter which is checked during decryption and encryption.

The PurgeAndExpireCookie method clears the hash table entry for the particular cookie. A PutDataInCookie method allows individual data to be inserted for a particular parameter in the cookie. Likewise, a RemoveDataFromCookie method allows a particular attribute to be removed from a cookie. The PurgeCookie method clears the cookie content and resets the cookie. The GetDataFromCookie function allows one to find a given value for a particular parameter in a cookie. The PutPostedDataInCookie function allows one to retrieve data from a form request and insert the data form entry into the cookie value. The SetCookieProperties function allows setting of the cookie restrictions checked at the attribute CheckCookieRestrictions. The SetCookie method calls the methods, set forth in the FIG. 5, to check the level-access permissions, serialize the cookie, compress the contents, encrypt the cookie contents and set the cookie value in the cookie collection. The function SubstituteStringByCookieParameter allows a given string to be substituted in a particular cookie name.

The cryptography implementation class is one example of a wholly aggregated sub-class of the state management class used to implement the present invention. It will be understood that the crypto class may be accompanied by a compression class, a serialization class, a hash object class, and other implementation classes in order to implement the functions described herein. As shown in FIG. 6, one hash method which may be used is an MD5 hash. Other hashing methods may be used. Two encryption methods (Encrypt), one for data and one for the memory stream object, are provided. Likewise, two decryption functions (Decrypt), one for data and one for the memory stream object, are provided. A DictionaryToMemoryStream attribute and MemoryStreamToDictionary indicate whether the cookie is to be provided as part of a request or part of a response. The EncryptCookie method returns an encrypted string for use by the compression algorithm. The EncryptAndSetCookie sets the cookie in the cookie store. A DecryptCookie method will be called for session cookies requiring a runtime decryption.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of processing cookies for use in a computer, comprising the steps of:
serializing a cookie into a memory stream, wherein the serialized cookie prevents a user from accessing cookie data associated with the cookie;
compressing the serialized cookie;
encrypting the serialized, compressed cookie prior to entering the cookie in a cookie container;
in response to a request process, decrypting, decompressing and deserializing the cookie before entering the cookie data into a data dictionary;
entering cookie data in the data dictionary;
setting an HTTP-only attribute prior to forwarding a cookie to a server; and
setting a secure transmission only attribute prior to forwarding a cookie to a server.

2. The method of claim 1 wherein said steps of encrypting, compressing and serializing are performed prior to entering the cookie in a cookie container in non-volatile storage.

3. The method of claim 1 wherein said steps of encrypting, compressing and serializing are performed prior to entering the cookie in a cookie container in volatile storage.

4. The method of claim 1 wherein the method further includes the step of: restricting cookies not having a secure counterpart by application type.

5. The method of claim 4 wherein the cookie is a service cookie and the method includes the step of sending a security cookie comprising a hash of the service cookie to a server.

6. The method of claim 1 wherein the method further includes providing a timespan attribute for a session cookie.

7. The method of claim 6 wherein said at least two of the steps further include decrypting a cookie, and said method further includes validating the cookie using the timespan attribute during said decrypting step.

8. The method of claim 1 wherein the method comprises an additional step of:
extracting a compressed, encrypted cookie from the cookie container.

9. The method of claim 1 wherein the method comprises an additional step of:
de-serializing a cookie extracted from the cookie container.

10. The method of claim 1 wherein the method comprises an additional step of:
creating a data dictionary entry for the cookie.

11. In a computing environment, a system comprising:
a browser component that parses and interprets requests and responses; and
a security mechanism operatively coupled to the transport medium, including controlling access to a cookie container by:
serializing a cookie into a memory stream, wherein the serialized cookie prevents a user from accessing cookie data associated with the cookie;
compressing the serialized cookie;
encrypting the serialized, compressed cookie prior to entering the cookie in a cookie container;

in response to a request process, decrypting, decompressing and deserializing the cookie before entering the cookie data into a data dictionary;

entering cookie data in the data dictionary;

setting an HTTP-only attribute prior to forwarding a cookie to a server and setting a secure transmission only attribute prior to forwarding a cookie to a server.

12. The system of claim 11 wherein the security mechanism further includes controlling access to a cookie container by employing an security check function validating a time span entry in a session cookie when employing said cryptographic method.

13. The system of claim 11 wherein the security mechanism further includes controlling access to a cookie container by employing a security cookie comprising a hash of a service cookie.

* * * * *